INVENTOR.
George M. Gibson

Dec. 19, 1961  G. M. GIBSON  3,013,423
PUMP CONTROLLED FLUID SYSTEM FOR PRESSURE TYPE CLOTHES
WATER EXTRACTION WASHING MACHINES
Filed July 8, 1955  8 Sheets-Sheet 5
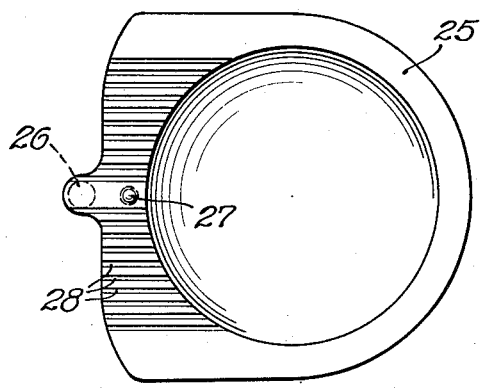
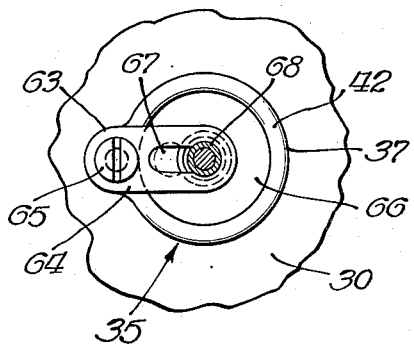
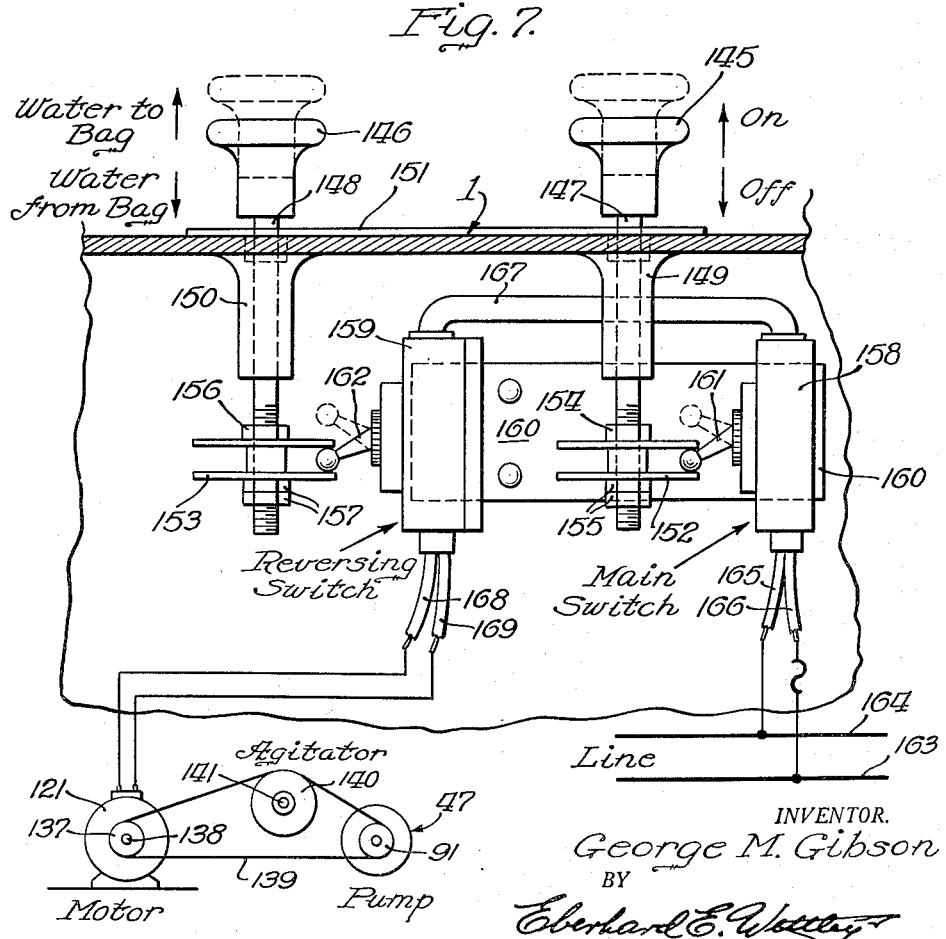
INVENTOR.
George M. Gibson
BY
Eberhard E. Wolley
Atty.

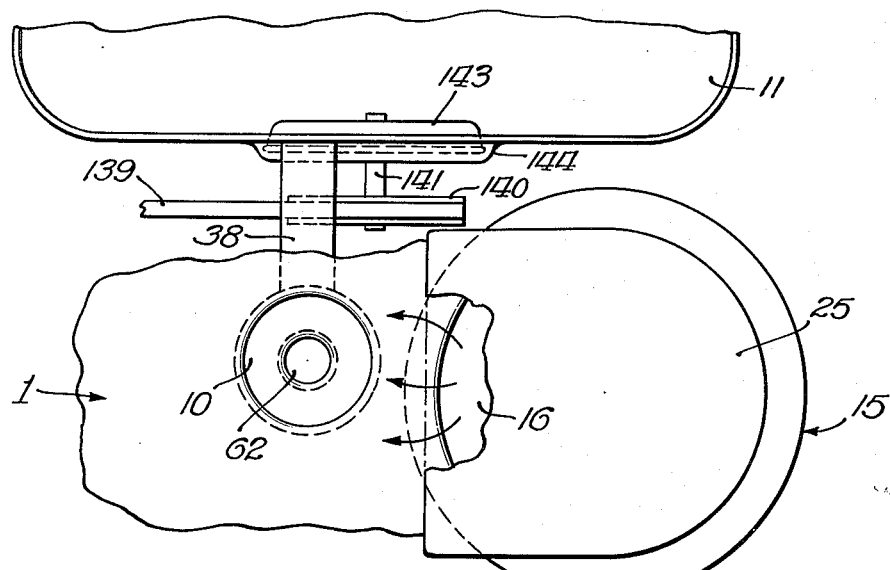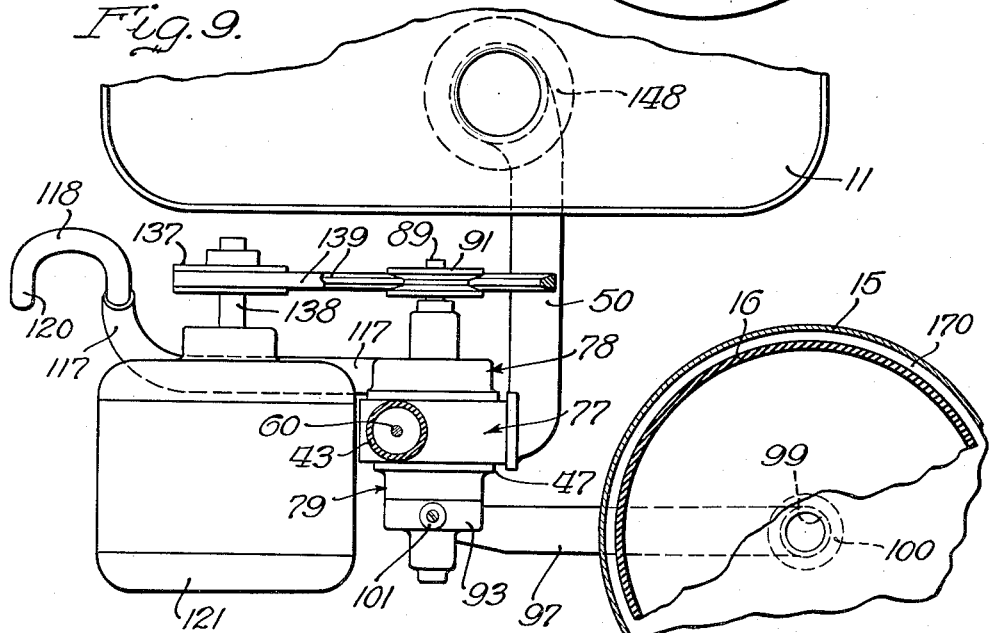

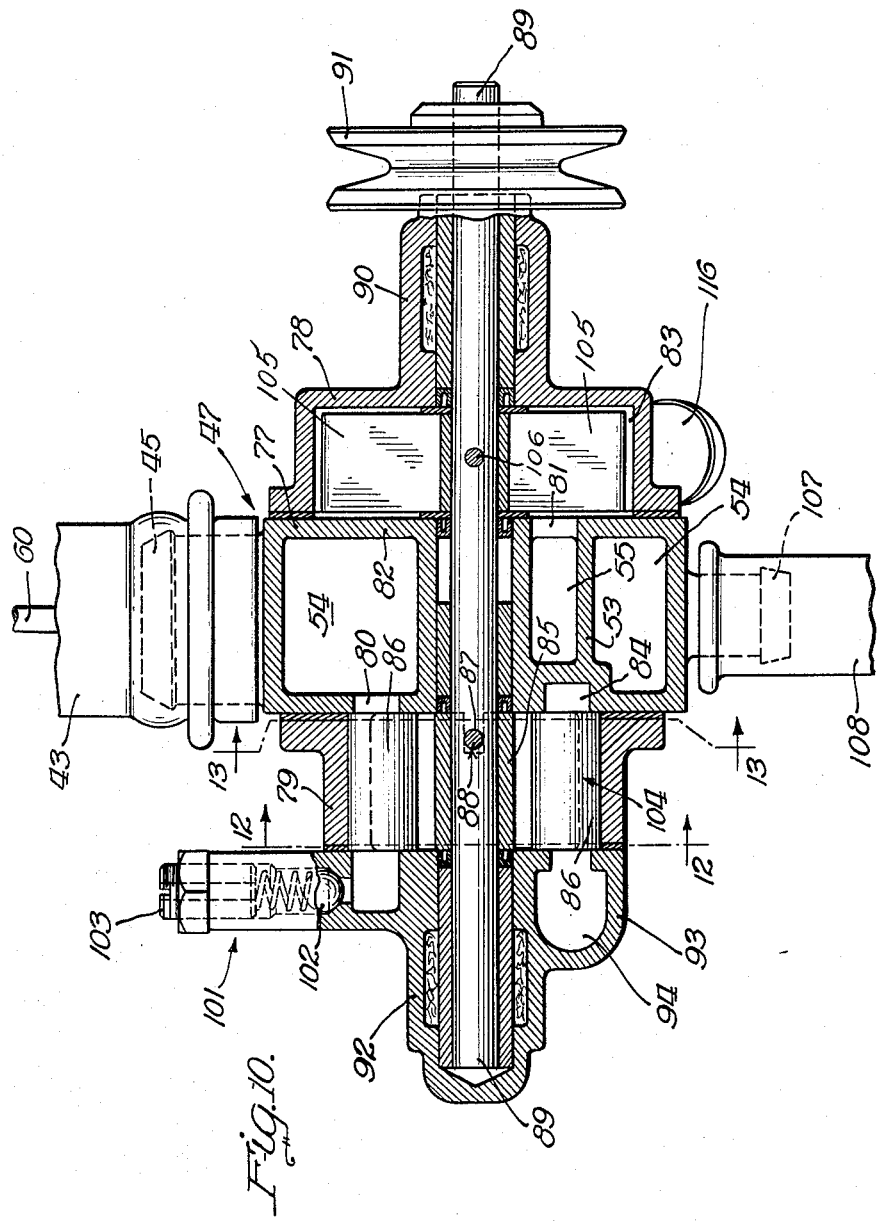

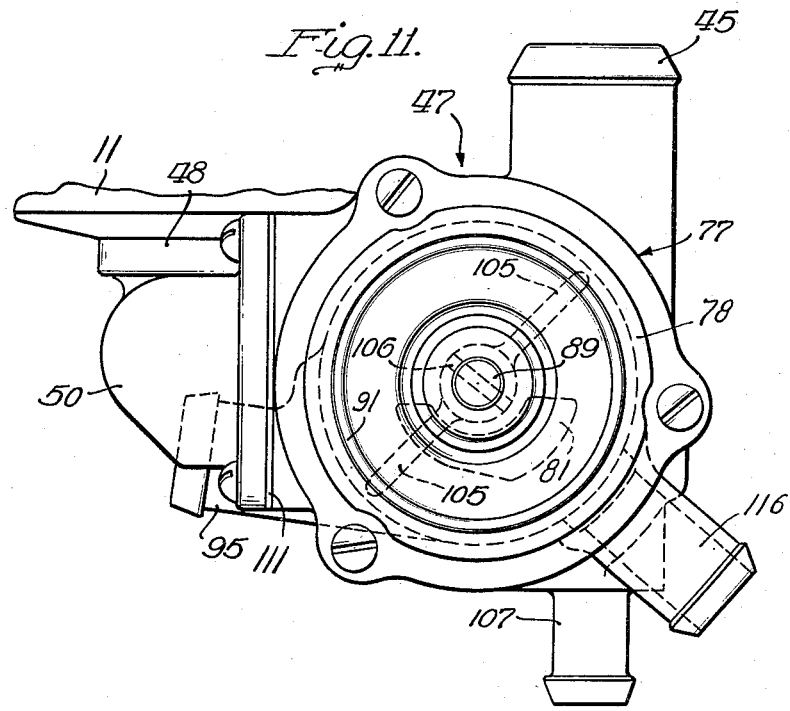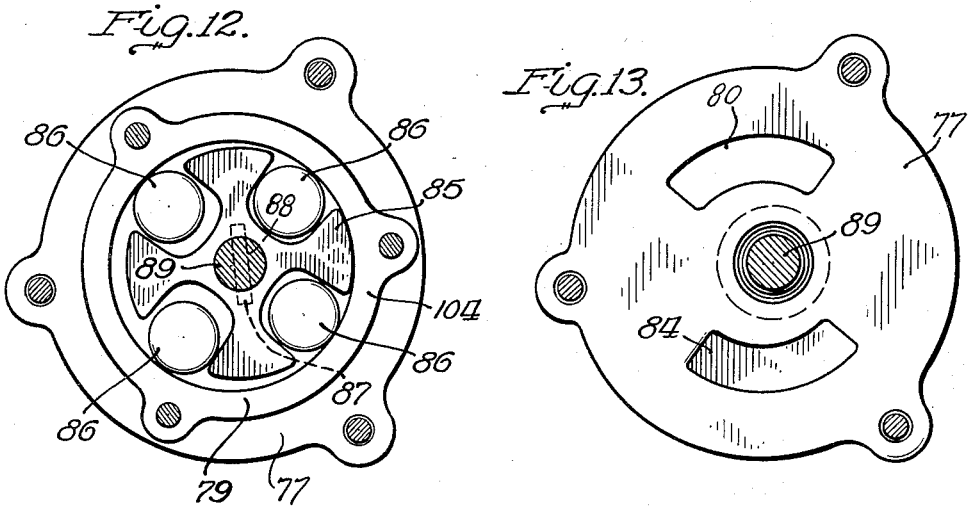

ns_ranged for the dual function of establishing a pressure source for the operation of the pressure extraction unit and to accommodate and dispense overflow water from the tub and/or extracted water and also to quickly empty the tub when the washing operation is completed. The water supply to the pump is directly obtained from the wash water tub and this same water is returned to the tub after the extraction cycle is terminated.

United States Patent Office 3,013,423
Patented Dec. 19, 1961

3,013,423
PUMP CONTROLLED FLUID SYSTEM FOR PRESSURE TYPE CLOTHES WATER EXTRACTION WASHING MACHINES
George M. Gibson, % G. M. Gibson Corp., Bellevue, Iowa
Filed July 8, 1955, Ser. No. 520,732
17 Claims. (Cl. 68—21)

This invention relates to a domestic clothes washing machine including in combination an agitator type clothes washing tub and a pressure type clothes water extraction and rinsing unit all efficiently related in a convenient and cooperative manner in a single compact housing structure. The invention is more specifically directed to certain projected features and other improvements associated with a washing machine of the general character shown and described in my copending application Serial No. 167,641, filed June 12, 1950, now Patent No. 2,759,348 issued on Aug. 21, 1956, and of which the present application comprises a continuation-in-part.

One of the objects of the present invention is to provide a semi-automatic washing machine of the water pressure clothes water extraction type wherein the water supply source to operate the pressure extraction means is carried and contained within the machine per se, and thus the machine provides its own supply of water that can be subjected under pressure to provide the activating means for the operation of the water pressure extraction unit.

In many districts or areas water pressure is not available or where pressure water systems are provided, the water pressure may fluctuate to such an extent as to be undependable for the proper and efficient operation of a washing machine using a pressurized water extraction cycle. These undesirable situations are overcome by the washing machine of the present design and invention incorporating a reversible full pressure pump to serve a water extraction unit and to rapidly and forcibly pressure empty such a unit under the various attributes and conditions of the nature and kind as noted in the foregoing object and in the following objects and descriptions directed to the invention.

Another object of the present invention is to provide a plurality of interconnected water handling conduits all tied in with and connected with a centrally established pumping structure arrangement to provide a complete washing system simple to operate and to provide a comparatively low cost machine that will efficiently wash and damp dry clothes in a very short time cycle of operation and under a considerable saving of water. From experience, this machine can take care of a family wash of five loads, averaging about 7 lbs. per load, in a matter of 27 minutes.

It is another object of the present invention to provide a semi-automatic washing machine with interconnected conduits and pumping structure that includes a reversible motor to drive the pump means together with simple button operated controls for the regulation of the current supply to the motor to carry out the extraction cycle of operation, all coupled with a single valving arrangement in the conduit system to maintain proper water diversion in accordance with the settings of the electrical controls.

It is still a further object of the present invention to provide a generally symmetrically designed impeller or agitator that will effectively carry out the washing operation in the tub while rotating in either direction of rotation permitting the use of a single motor as the sole motivating power to simultaneously drive both the agitator and the pump means in the operation of the machine.

Another object of the present invention is to provide a new and novel pumping mechanism constructed and arranged for the dual function of establishing a pressure source for the operation of the pressure extraction unit and to accommodate and dispense overflow water from the tub and/or extracted water and also to quickly empty the tub when the washing operation is completed. The water supply to the pump is directly obtained from the wash water tub and this same water is returned to the tub after the extraction cycle is terminated.

Other objects and advantages relating to the present invention shall hereinafter appear in the following detailed description directed to a preferred embodiment of the washing machine as the same is disclosed in the accompanying drawings forming a part of this specification.

In the drawings:

FIGURE 5 is a detailed view in plan section as substantially seen along the line 5—5 in FIGURE 3 to show further details of construction of the valve operating mechanism;

FIGURE 6 is an underneath view of the lid or cover of the extraction unit to show certain details in the design and construction thereof;

FIGURE 7 is a general diagrammatic view of the electric button control mechanism as used for the regulation of the electrical circuits for the operation of the present machine;

FIGURE 8 is a diagrammatic plan view of the conduit system and the relationship of the construction of the upper portion of the washer;

FIGURE 9 is a similar diagrammatic plan view showing further construction details of the fluid system and the connective arrangement thereof as found in the lower portion of the washing machine;

FIGURE 10 is a transverse vertical cross sectional view taken through the compound pump arrangement used for the operation of the washing machine comprising the centralizing, connecting and operating unit of the conduit system;

FIGURE 11 is an end elevational view of the pump structure as viewed from the right hand side of the FIGURE 10 illustration thereof;

FIGURE 12 is a vertical, cross sectional view taken substantially in the plane of the line 12—12 in FIGURE 10; and FIGURE 13 is another vertical, sectional view taken substantially along the plane of the line 13—13 of FIGURE 10 to show further details of construction of the pump.

Figure 1:
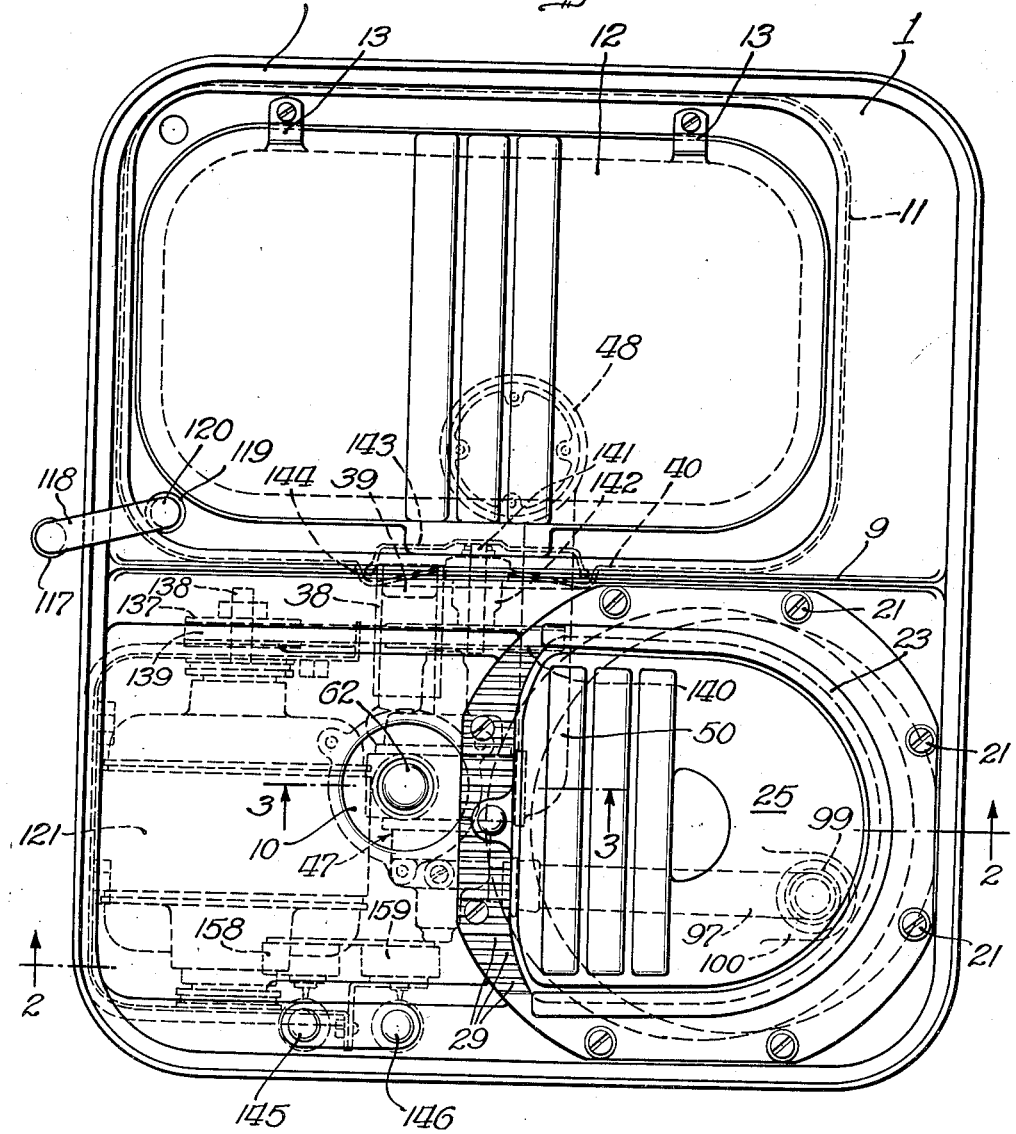
FIGURE 1 is a plan view of the washing machine incorporating the new and novel features of the present invention.
Figure 2:
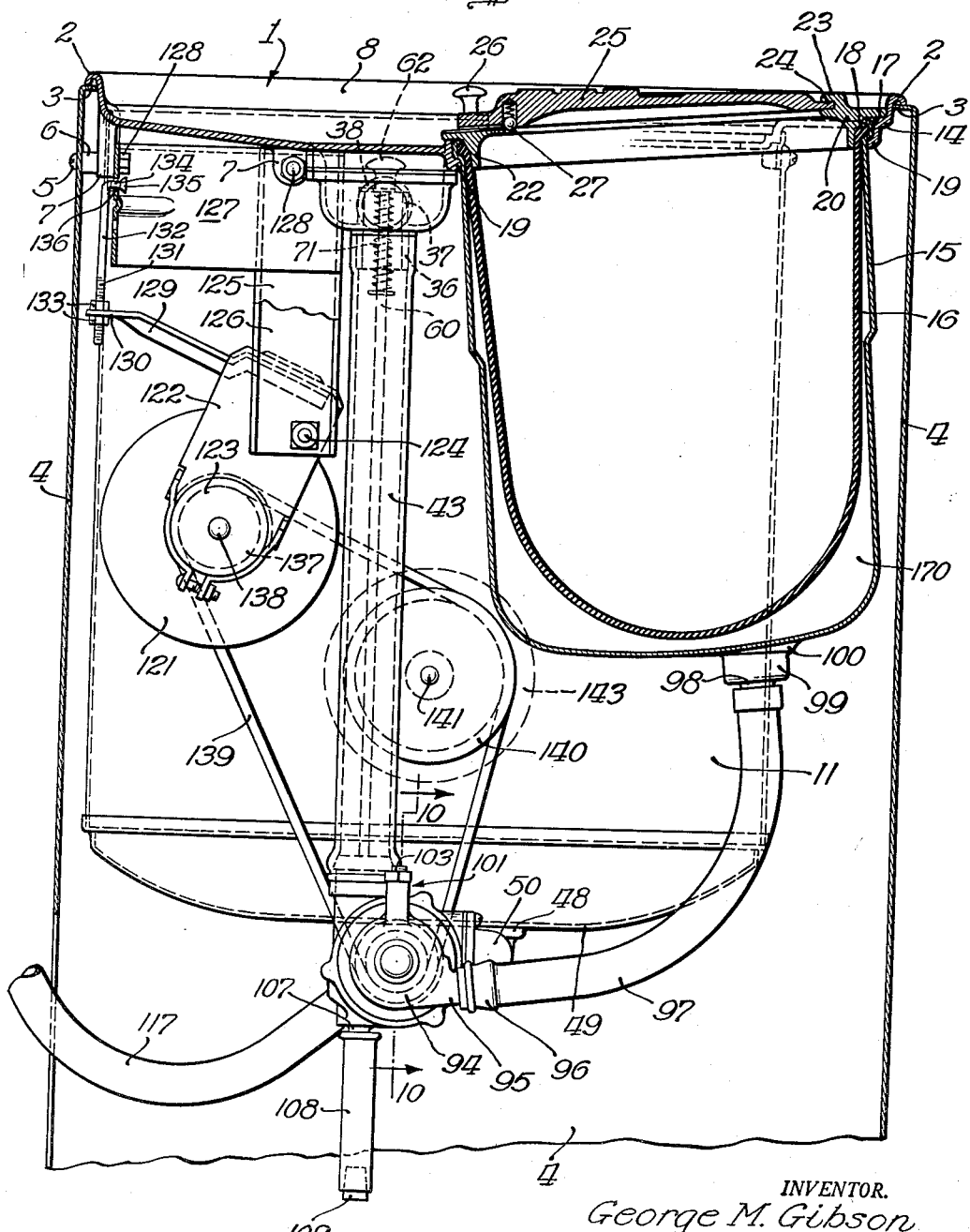
FIGURE 2 is a transverse vertical cross sectional view taken substantially along the line 2—2 in FIGURE 1 to illustrate further details of construction thereof.

Referring more specifically to FIGURES 1 and 2, the present washing machine comprises a top or crown 1 having outwardly flanged portions 2 which rest upon the inturned ledges 3 of a machine encircling housing 4 with the crown being suitably attached to the housing by means of screw fashenings such as 5 connected through spacers 6 with legs 7 forming a part of the crown structure. The entire washing machine mechanisms are suitably supported in operative relationship with respect to each other from the crown structure and in the manner and for the purposes more specifically explained and set forth in my copending application Serial No. 167,641, filed June 12, 1950, now Patent No. 2,759,348.

The crown 1 includes an encircling barrier or rim 8 with a central division rib or baffle 9 dividing the washing section of the machine from the extraction section and with the configuration of the entire crown being constructed and arranged for the disposal of spilled wash water so that this water will either drain back into the tub proper or into a central sump 10 provided on the extraction side of the machine.

As best shown in FIGURES 1 and 2, the machine incorporates the washing tub 11 that may be exposed or covered by means of the lid 12 that is suitably hinged at 13 with the crown 1.

At the extraction side of the machine the crown is provided with suitable depending and shouldered supporting structure 14 positioned as shown in FIGURE 2 in a predetermined angular relation with respect to the horizontal for supporting the metal cylinder 15 and the resilient bag 16 through the terminal flanged portions 17 and 18 upon the shouldered portion 19 of the support 14. A sealing ring 20 cooperates with the support 14 and is tightly secured thereto by means of the screws 21 that fasten to the support 14 and which drive the sealing member and its depending flange 22 downwardly into a position to tightly seal the metal cylinder 15 and resilient bag upon their supporting shoulders 19. At the same time the sealing ring carries a semi-circular flanged arrangement 23 which is adapted for receiving the edges 24 of the cover or lid 25 which closes the extraction chamber defined by the bag 16.

The lid or cover 25 is provided with a knob 26 for moving the cover or lid relatively to the flanged portion 23 to open or close the extraction cylinder unit and suitable detent means such as the spring pressed ball 27 is associated with the cover or lid to prevent accidental displacement thereof when the lid is in place closing off the extraction chamber. In addition, it should be noted that the under side of the lid is provided with suitable fluted portions or grooves 28 as shown in FIGURE 6, while the forward face portion of the sealing ring 20 is further provided with similar fluted portions or grooves 29 to establish a run off of the water from the extraction unit. With this fluted or grooved arrangement together with the general tilting of the extraction cylinder unit as shown in FIGURE 2, a predetermind directional water flow is established which will direct extracted washing water or rinse water out of the clothes and in the direction of the portion of the crown 1 which contains the sump 10.

Figure 3:
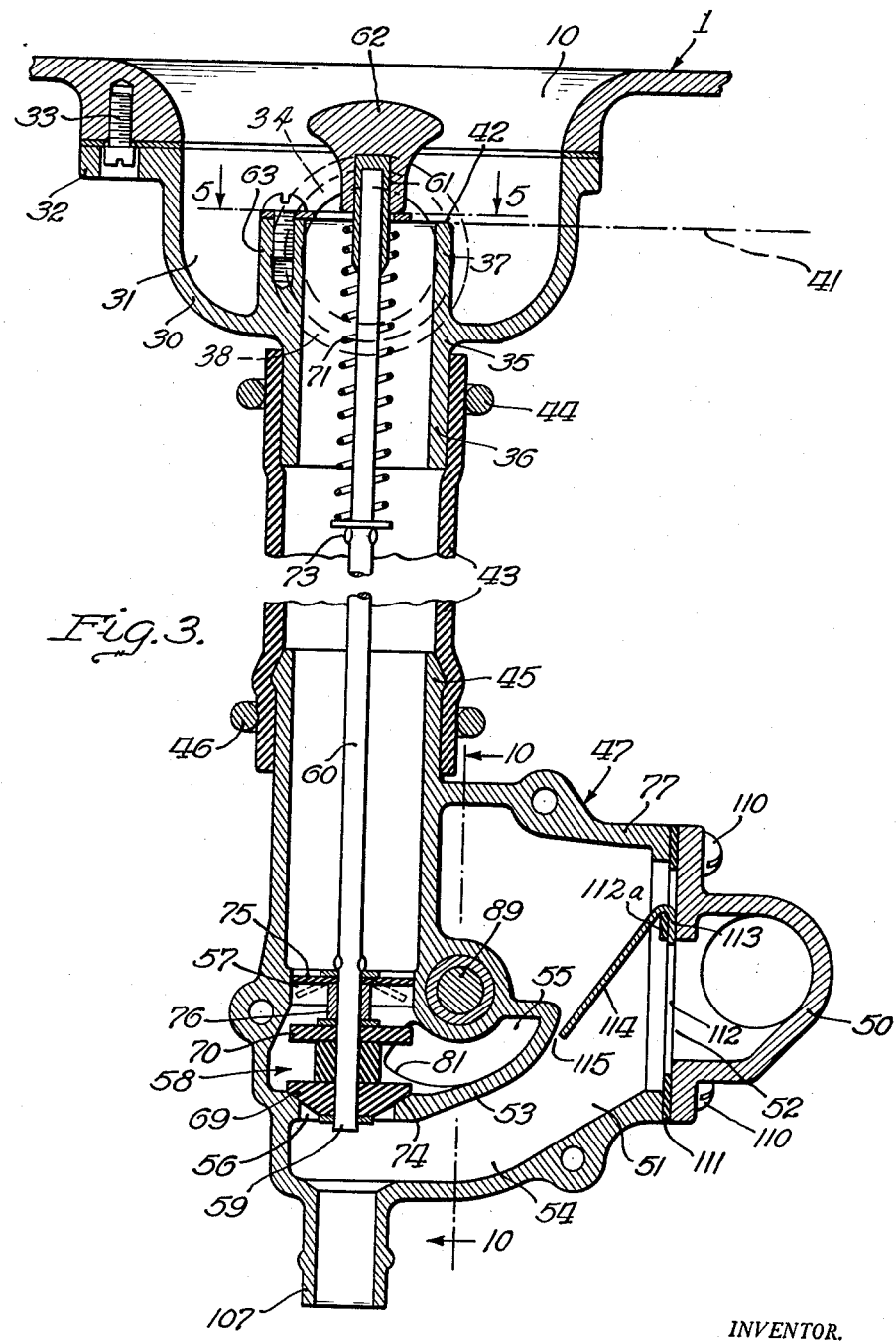
FIGURE 3 is a vertical transverse cross sectional view through the overflow conduit and control structure including the pump as taken substantially along the line 3—3 in FIGURE 1 with the valving arrangement of the control means being shown in one position of operation and in the position which it occupies during the normal washing operation of the machine.

Referring now more specifically to FIGURES 1, 2 and 3, the water collecting fitting 30 provides a bowl or well 31 which is connected by means of flanges 32 and screws 33 with the well or sump portion 10 of the crown 1, and this fitting 30 includes a lateral sleeve 34 and a vertically arranged sleeve 35 having a depending rim 36 and an upstanding rim 37. The sleeve 34 is connected by means of a flexible hose or conduit 38 with a nipple or sleeve 39 that is connected with and arranged to communicate with the tub 11 through the side 40 thereof. It is through the latter connection and the hose coupling 38 as well as the nipple 39 on the tub that a predetermined water level such as shown in dot and dash lines at 41 in FIGURE 3 is established for the ideal and desired wash water depth in the tub. This level is definitely maintained by means of the upstanding sleeve or flange 37 of the fitting 30 so that any excess water above the level 41 will flow over the rim 42 of the sleeve 37 and through the bowl sleeve 35.

The overflow water drain arrangement which also accommodates excess and extraction and rinse water includes a vertically positioned tube or hose connection 43 which is secured by means of a suitable clamp ring 44 to the depending sleeve portion 36 of the bowl or fitting 30 while the lower end of this tube is connected to sleeve 45 by means of the clamp ring 46, with sleeve 45 comprising an integral portion of the pump 47. This pump is suspended in rigid fashion by means of a flange 48 which is tightly and rigidly connected with the bottom 49 of the tub 11 and which flanges comprises a part of a communicating manifold 50 that communicates with the interior chamber 51 of the pump 47 through the opening 52 in the manifold 50. This provides a communication from the washing tub to provide a duct arrangement which will supply the pump 47 with the washing water in the tub and which supply communicates with the high pressure side of the pump as will be more fully described. Referring now back to the FIGURE 3 illustration, it should be noted that the pump is provided with a wall 53 which divides the pump into a high pressure side 54 and a low pressure side 55 and that the wall 53 includes a port 56 with a second port or orifice 57 located in spaced relation with respect to port 56 and to close off the low pressure section of the pump from drain tube 43. A composite valve member or unit 58 is carried in fixed relation to the bottom end 59 of a rod 60 that extends upwardly through the hose 43 and carries a metal sleeve 61 that is secured to an operating knob 62.

By referring to FIGURES 3 and 5, it should be noted that the upstanding rim or sleeve 37 includes an offset boss 63 to support one end of a detent clip 64 which is secured to the boss by means of the screw 65. This clip extends over the opening 66 that is formed through the bowl sleeve 35 and contains a key hole slot having a narrow portion 67 and a rounded portion 68 to accommodate the fitting or sleeve 61 so that the valve unit as operated by the knob 62 can be dropped through the opening 68 into the position illustrated in FIGURE 3. When the valve unit and rod 60 are in the lowered position as shown in FIGURE 3, the lower valve 69 of the valve unit 58 closes port 56. By raising the valve unit through the instrumentality of the knob 62, it is possible to bring the sleeve 61 out of the opening 68 and to then move the rod 60 laterally of the clip 64 into the narrow opening 67 and into the position shown in FIGURE 4. When in this position, the valve mechanism brings the upper valve 70 of the valve structure 58 into the port 57 closing off the latter and providing communication between the low pressure chamber 55 and the high pressure chamber 54 of the pump through the port 56.

Figure 4:
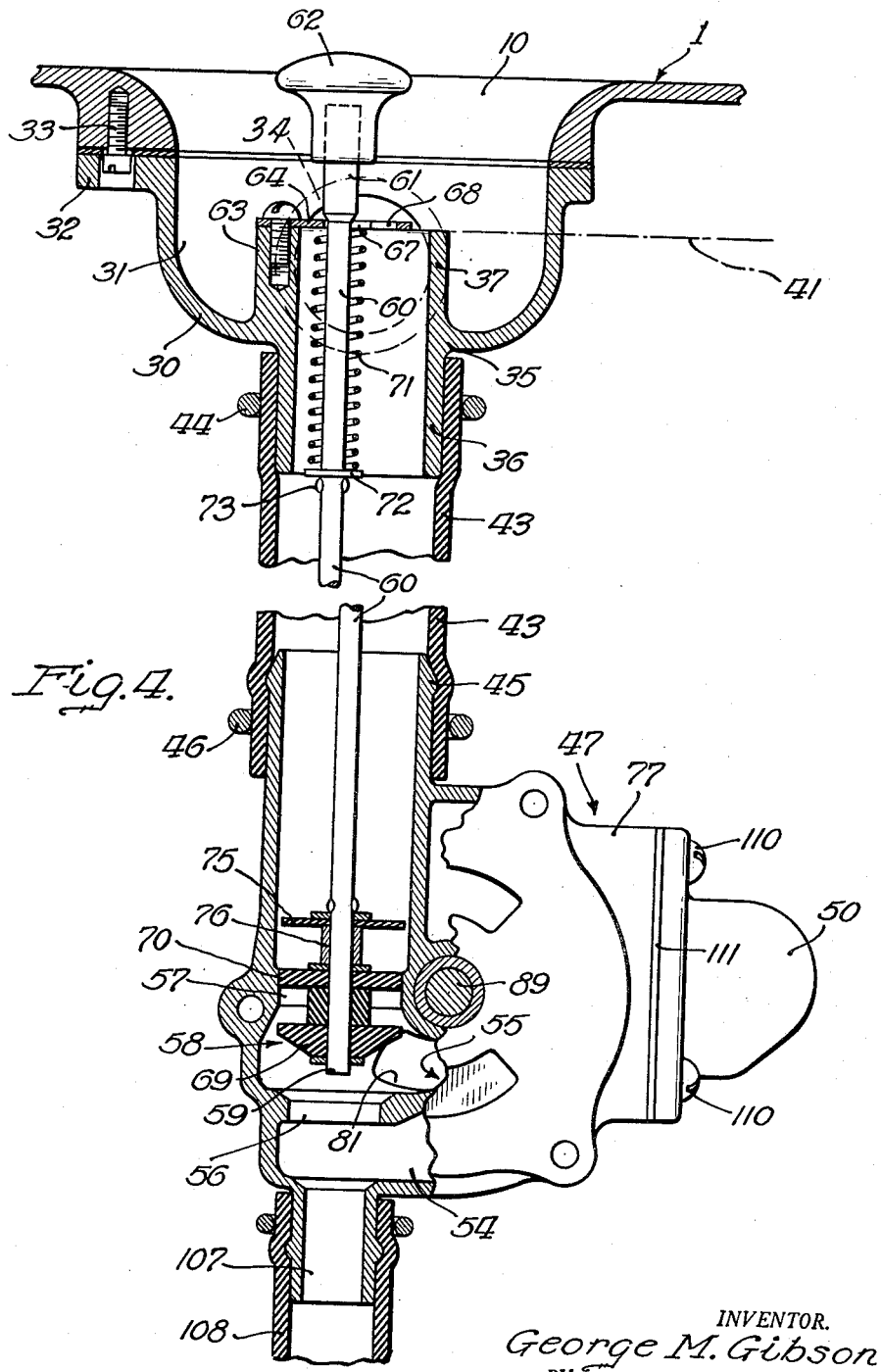
FIGURE 4 is a similar cross sectional view as that shown in FIGURE 3, but illustrating the valving arrangement in a different position and for purposes of draining the washer.

In order to maintain the positions of the valve mechanism as shown either in FIGURE 3 or in FIGURE 4, an expansion spring 71 is carried in coiled relation about the upper end of rod 60 and engages the underside of the clip 64 and abuts against the stop ring 72 carried in the position shown in FIGURES 3 and 4 by means of the struck out ears 73 on rod 60. With the use of the spring 71 and with the valve as shown in the position in FIGURE 3, the spring will tightly maintain the outer valve or valve head 69 in sealing engagement with the bevelled portion or valve seat 74 adjacent the valve port 56 and upon raising of the valve and moving it laterally as illustrated in FIGURE 4, the spring 71 will frictionally maintain the entire valve mechanism and rod 60 in the position shown.

It should also be noted that the valve 58 includes a flat circular diaphragm 75 that is spaced upwardly through the sleeve member 76 above the upper valve 70 and which is arranged to provide a means for eliminating gurgle or other water noises in the low pressure section 55 of the pump 47. This annular diaphragm 75 is normally rendered operative when the valve is in the down position as shown in FIGURE 3 at which time this diaphragm coacts with the walls of the port 57 as shown in full lines in FIGURE 3. This closes off this chamber 55 and provides a means to reduce and eliminate gurgle noises. If and when any water should get into the vertical column as generally defined by the hose 43 and its connected sleeve members, the weight of the water will open the diaphragm 75 into the dotted line position illustrated in FIGURE 3 so as to let this water down into the low pressure chamber 55 for disposal by the low pressure impeller portion of the pump.

Referring more specifically to FIGURES 10 to 13 inclusive, it should be noted that the pump 47 comprises the main central housing 77 which carries the upstanding sleeve 45 for receiving the end of the hose 43 and carries a low pressure housing 78 at one side thereof suitably connected with housing 77 and also carries a high pressure housing 79 secured to the other side of the housing 77. Housing 77 also carries a high pressure port 80 which communicates with the high pressure housing 79 from within the high pressure section or chamber 54 of the pump while another port 81 is connected or formed through the wall 82 of the housing 77 to connect the low pressure chamber 55 with the interior compartment of the vane pump 83. The other wall of the housing 77 includes a blind port such as 84 which provides a fluid reservoir associated with the interior of the housing 79 of the high pressure section of the pump.

The high pressure section of the pump includes a rotor 85 as best shown in FIGURES 10 and 12 which rotor drives a plurality of cylinders 86 about the high pressure housing 79, this rotor being suitably secured by means of a pin 87 passing through an opening 88 in the drive shaft 89 of the pump. This shaft extends outwardly of the pump housing through an oil seal bearing 90 and has mounted thereon a pulley 91 that is secured to the shaft. The other end of the shaft 89 is dead ended in another oil seal bearing 92 which forms a part of an auxiliary housing 93. Housing 93 includes the high pressure compartment 94 that has a nipple 95 connected therewith as shown in FIGURES 2 and 11 to receive one end 96 of a high pressure hose 97 which is suitably connected to a nipple 98 forming a part of a manifold 99 that is secured to a boss 100 in the bottom of the metal extraction cylinder 15.

In another portion of the high pressure housing 93 and communicating with the compartment 94 the pump is provided with a check relief valve 101 having an adjustable spring pressed ball 102 which can be regulated by means of screw means 103 to provide a pressure relief at a predetermined amount of fluid pressure as established by the cylinder pump 104. Thus the high pressure side of the pump may be controlled against any excessive pressure by means of the pressure relief valve 101.

The circulating vane pump includes oppositely disposed vanes 105 that are connected to operate directly with the shaft 89 by means of a cross pin such as 106 as best shown in FIGURES 10 and 11. Thus both the vane pump 83 and the high pressure pump 104 are directly operated in unison by the rotation of shaft 89 as accomplished through the pulley 91 and either of these pump units or sections will operate and function regardless of the direction of rotation of shaft 89.

It should also be noted that the pump is further provided with a depending nipple 107 as shown in FIGURES 2, 10 and 11 to which is attached a depending section of the hose 108 carrying a releasable plug or cork 109. The purpose of the latter extension is to provide a means for catching sediment and other foreign materials that may find their way into the pump and will settle into the bottom of the extension tube or hose 108. Such sediment and other foreign matter may easily be drained out of the unit by removal of the cork 109 which may be accomplished from time to time to keep such sediment out of the fluid system of the washing machine.

It should also be noted as best illustrated in FIGURE 3 that the manifold 50 is secured to the housing 77 of the pump by means of screws 110 including an interposed gasket such as 111, to prevent leakage at this joint of the pump. The gasket 111 is cut out for access at 112 to provide open communication between the manifold and the high pressure portion 54 of the pump. The gasket also includes a cross bar or strip portion 112a which is an integral portion of gasket 111 and is adapted to receive the end 113 of a deflecting baffle 114 which has sufficient clearance thereabout and as shown at 115 to let the washing fluids pass through the pump in the normal operation thereof but which baffle also aids as a means for deflecting foreign matter and sediment in the direction of the lower chamber 51 of the pump so that such sediment or foreign matter will find its way into the sediment unit as established by the hose extension 108 previously described.

As best shown in FIGURES 2, 10 and 11, the circulating vane pump 83 includes a lateral discharge nipple 116 extending out of the housing 78 which carries one end of a fluid hose 117 that connects with a hook tube 118 as best shown in FIGURES 1 and 9. Also as shown in FIGURE 1 the crown 1 is provided with a suitable opening 119 for the reception of the short end 120 of the hook tube 118 of the hose connection described and leading from the circulating vane pump.

The main drive, and in this case the only power unit provided for operating the washing machine mechanisms, is a motor 121 as best shown in FIGURES 1 and 2. This motor is carried by a suitable bracket 122 supporting both ends of the reduced motor housing portions 123 and this bracket is pivotally carried at 124 upon a bolt supported from the two legs 125 and 126 of a hanger structure secured to an overhead plate member 127 that is carried upon the crown by means of bolts such as 128 also connected with depending legs such as 7 forming an integral portion of the crown 1.

A laterally arranged arm 129 is connected with the upper portion of the bracket structure 122 and terminates in an apertured ear 130 which receives the threaded end 131 of a supporting rod 132. A pair of nuts 133 are arranged for adjusting the position of the arm 129 and also the angular relationship of the entire bracket 122 and the supported motor 121 in respect to the pivotal mounting shaft 124. The upper end of the tension rod 132 includes a bearing piece 134 having an enlarged head 135 with the bearing piece hooked through the opening 136 in the plate structure 127, thus suspending the motor 121 in a given relation to the washing machine structure.

Motor 121 includes a pulley 137 secured to the motor drive shaft 138 and a V-belt 139 is trained over this pulley and over the pump pulley 91 and also over a second pulley 140 which is secured to a shaft 141 that projects through suitable bearing means such as 142 illustrated in FIGURE 1 to enter the tub 11 and to be fixedly connected with the agitator or impeller 143 which is mounted within a recess 144 formed in the side wall 40 of the tub 11.

The motor 121 is a reversible motor which will run in either direction depending upon the polarity of the current directed thereto and connected therewith. The impeller or agitator 143 is unidirectional and substantially symmetrical so that it may operate in either direction of rotation. As previously described, the pump 47 is also capable of operation in either direction of rotation of its drive shaft 89. Thus the various mechanisms of the washing machine may be driven by the motor of the reversible type described and which also permits the simplified arrangement of having the three pulleys connected as shown in FIGURES 1 and 2 disposed in a common plane and wherein the motor may be bodily shifted to provide the proper belt tension to obtain the most efficient drive of the units connected therewith for operation.

The general operation of the machine may be readily followed with reference to the diagrammatic views of FIGURES 8 and 9 which more or less form flow sheet diagrams more specifically showing the conduit system, the arrangement of the pump and also the drive of the motor to the mechanism operating this particular washing machine as well as the conduit connections to the extraction cylinder.

The general operation of the machine might best be understood, therefore, with reference to FIGURES 7, 8 and 9. FIGURE 7 shows the controls that regulate the electrical current through the circuits used in operating a motor and the devices driven therefrom. FIGURE 7 diagrammatically illustrates the use of a pair of control buttons 145 and 146 each independently connected to a pair of push rods 147 and 148 that are reciprocably carried in a pair of bosses 149 and 150 and which operate through an indicia plate 151 which will normally carry the directions of operation of the washing machine and in relation to the buttons described.

Each of the push rods are adapted to adjustably carry a spool member such as 152 and 153 which can be vertically shifted by means of the nuts 154 and 155 on the push rod 147 and by the nuts 156 and 157 carried on the push rod 148, respectively.

A pair of conventional switches such as 158 and 159 are carried upon a bracket such as 160 that may be secured to the housing 4 of the washing machine or to some other bracket extending from the housing or crown 1 and each of these switches is operated by means of the levers 161 and 162, respectively.

As best shown in FIGURES 1 and 7, the switch levers 161 and 162 are carried between the parallel portions of the spool units 152 and 153 so that actuation of the spools by the connected knobs 145 or 146 will operate the switches 158 and 159.

The line current comes in over the wires 163 and 164 and connects through the switch wires 165 and 166 of switch 158 which will provide a master control switch of the current to the motor of the machine. A suitable cable or other conduit means 167 brings the line from switch 158 into the switch 159 which is a reversing switch that will automatically take care of changing the polarity of the current as employed to run the motor 121. Suitable wires such as 168 and 169 will lead from the reversing switch 159 down to the motor 121 which will then drive the various units as diagrammatically illustrated in FIGURE 7 according to the particular positions occupied by the buttons 145 and 146.

For the normal machine operation the knob 62 of the valve mechanism shown in FIGURES 3 and 4 will be down in the position shown in full lines in FIGURE 3. This will separate the low pressure chamber 55 and the high pressure chamber 54. Then with knob 146 in FIGURE 7 down in the full line position shown, the operator pulls the knob 145 upwardly energizing the motor 121 through the switch 158 and the reversing switch 159 which will rotate the agitator and drive the pump in a direction to create a suction in the extraction cylinder 15 and in the space 170 which is between the cylinder and the bag 16. This action will normally keep the full head of water in the washing machine tub since the high pressure side of the pump will then rotate in a direction to keep the wash water at its level through the pressure induced into the manifold 50 which leads to the bottom of the tub. The roller pump will merely rotate to maintain the head of water while the clothes are being washed by the impeller or agitator 143. The reversible action of the pump to supply water under pressure to the extraction device and to withdraw water under pressure during a suction cycle from the extraction device results in a clothes fluffing action made possible by the use of such a reversible pump and by the use of the simple kind of drive means employed with this type of a washer.

After the first batch of clothes are washed, the lid 25 is removed from the extracting cylinder and the clothes are transferred from the tube into the cylinder replacing the lid 25 to carry out the extraction cycle. This is then accomplished by raising the knob 146 which will reverse the direction of operation of the motor 121 and which will bring water through the manifold 50 from the tub wash water into the main housing 77 through the port 80 and into the pressure pump to be then directed out of the nipple 95 through the hose coupling and through fitting 99 into the metal cylinder 15 filling the pressure cavity 170 and exercising a compressive action about the bag 16 to collapse the latter upon the clothes and to force out the washing water which will flow out of the cooperating fluted portions or grooves 28 and 29 in the lid 25 and sealing ring 20. Pressure release on the bag will then result by pushing button 146 downwardly to again reverse the action of the motor and the pump to instantaneously withdraw the water from within the chamber 170 of the extraction cylinder thereby causing rapid and forced expansion of the resilient clothes confining bag 16 inducing a fluffing of the clothes held within the bag. The operator may then remove the lid or cover 25, and with the usual hose extension from a water faucet water can be poured upon the clothes to provide a rinsing wash filling the extraction chamber. Then by replacing the lid 25 the cycle may again be repeated by raising the button 146 to extract the water from the clothes. This particular rinse cycle may be further repeated as desired.

As previously stated the hook tube 118 may be left in the opening 119 in the crown 1 as shown in FIGURE 1, but with the additional rinsing cycles it might be preferable to use this hook tube over the edge of a laundry tub so that any excess water that may find its way into the tub and into the particular sump in the crown through the sleeve 34 will overflow downwardly through the bowl sleeve 35, tube 43 and into the low pressure vane pump side 83 of the pump 47 through the opening 81 in the wall 82 of the pump housing 77. Since the centrifugal action of the symmetrical vane will always be operating to expel water out of the peripheral exit nipple 116 of the vane housing 78, this overflow water will always be expelled through the hose 117 and the hook tube end 118 thereon. Obviously, it will normally be the practice to maintain the hook tube 118 in the crown opening 119 for the extraction of the first soapy wash water so that this may be kept in the tub for the next successive washing cycle. Also, it should be understood that while the extraction cycle is being carried on that the operator will again have charged the tub with another load of six or seven pounds of clothing which can be washing at the same time that the extraction cycle or rinsing cycles are being carried out. The operational fluid capacity of the extractor chamber 170 is relatively small in proportion to the fluid capacity of the washing machine tub 11, considering that a usual normal load of clothing has been taken from the tub and placed into the bag 16 for extraction. Thus the wash water remaining in the tub 11 will serve to carry on the washing cycle during the extraction operation. A certain amount of the extracted clothes water and suds can also be directed into the washing tub through tube 117 and hook 118 during the extraction cycle to serve as a selective means for adding to the fluid level of the tube water during the withdrawal of some of the tub water for the extractor.

After the washing operation has been completed and the operator wishes to empty the tub of wash water fairly rapidly, the valve control knob 62 can be lifted and moved laterally along the clip 64 as determined by the key hole opening therein to put this valve member into the position shown in full lines in FIGURE 4 which will then permit the vane pump 83 to draw the water through the manifold 50 from the tub 11 along the high pressure side 54 of the pump and upwardly through the port 56 and laterally through port 81 into the housing 78 of the vane pump 83. This water is then discharged through nipple 116, hose 117 and the hook tube 118 either to the floor or to a laundry tub or to some other receptacle provided for the purpose of receiving the draining wash water out of the washing machine tub.

The foregoing description has been directed more specifically to a preferred construction of washing machine of the present invention as disclosed in the drawings, but changes are contemplated in the general combination shown and described and also in some of the individual elements comprising portions of the general construction thereof. Any such changes shall, however, be governed by the breadth and scope of the appended claims directed to the invention.

What I claim is:

1. In a washing machine, a tub unit, an extraction unit, water drainboard means carried adjacent to said tub unit and about said extraction unit, said drainboard means having a sump, an overflow conduit leading from said tub unit to said sump, said sump providing an upstanding overflow sleeve to maintain the water level in the tub unit at or below a predetermined maximum, a drain conduit connected with said sump and extending downwardly therefrom, and a pump connected with said drain conduit and including branch conduits connected with the tub unit and the extraction unit, said pump providing high and low pressure means with the high pressure means associated with said branch conduits, said low pressure means including a discharge line, and valve means in said pump to selectively connect said branch conduits with said low pressure means to empty the tub unit through said discharge line, said overflow conduit normally communicating with said low pressure means through said valve means with said valve means interrupting such communication during the tub unit draining cycle.

2. In a washing machine, a tub unit, an extraction unit, water drainboard means carried adjacent to said tub unit and about said extraction unit, said drainboard means having a sump, an overflow conduit leading from said tub unit to said sump, said sump providing an upstanding overflow sleeve to maintain the water level in the tub unit at or below a predetermined maximum, a drain conduit connected with said sump and extending downwardly therefrom, and a pump connected with said drain conduit and including branch conduits connected with the tub unit and the extraction unit, said pump providing high and low pressure means with the high pressure means associated with said branch conduits, said low pressure means including a discharge line, and valve means in said pump to selectively connect said branch conduits with said low pressure means to empty the tub unit through said discharge line, said overflow conduit normally communicating with said low pressure means through said valve means with said valve means interrupting such communication during the tub unit draining cycle, and power operated drive means connected to drive the pump high and low pressure means, said power operated drive means including reversible means to reverse the operation of the pump means.

3. In a washing machine, in combination, a water reservoir including an agitator to wash clothes in said reservoir, a water pressure operated extraction mechanism for damp drying the clothes, a water pump, a water supply conduit connected between said reservoir and said pump, and a water delivery conduit connected between said pump and said extraction mechanism for the operation of the latter, and power operated drive means connected to drive said pump, said drive means including reversible means to selectively drive said pump in one direction to draw water from said reservoir and to direct such water under pressure into said extraction mechanism, or to drive said pump in the opposite direction to redirect the water from said extraction mechanism into said reservoir, said pump having a low pressure section and a water discharge duct leading therefrom, and overflow duct means leading from the upper level of said reservoir and connected with said low pressure section of said pump to discharge overflow water from said reservoir therethrough.

4. In a washing machine, in combination, a water reservoir, a water pressure operated extraction mechanism for damp drying the clothes, a water pump, a water supply conduit connected between said reservoir and said pump, and a water delivery conduit connected between said pump and said extraction mechanism for the operation of the latter, and power operated drive means connected to drive said pump, said drive means including reversible means to selectively drive said pump in one direction to draw water from said reservoir and to direct such water under pressure into said extraction mechanism, or to drive said pump in the opposite direction to redirect the water from said extraction mechanism into said reservoir, said pump having a low pressure section and a water discharge duct leading therefrom, and overflow duct means leading from the upper level of said reservoir and connected with said low pressure section of said pump to discharge overflow water from said reservoir therethrough, and drain water diversion means disposed about the extraction water discharge end of said extraction mechanism and arranged for communication with said overflow duct means for discharge through the latter and through the low pressure section of said pump.

5. In a washing machine, in combination, a water reservoir, a water pressure operated extraction mechanism for damp drying the clothes, a water pump, a water supply conduit connected between said reservoir and said pump, and a water delivery conduit connected between said pump and said extraction mechanism for the operation of the latter, and power operated drive means connected to drive said pump, said drive means including reversible means to selectively drive said pump in one direction to draw water from said reservoir and to direct such water under pressure into said extraction mechanism, or to drive said pump in the opposite direction to redirect the water from said extraction mechanism into said reservoir, said pump having a low pressure section and a water discharge duct leading therefrom, and overflow duct means leading from the upper level of said reservoir and connected with said low pressure section of said pump to discharge overflow water from said reservoir therethrough, and valve means in said pump interposed between said low pressure section of said pump and the portion of said pump serving said reservoir and extraction mechanism conduits and to provide a selective water discharge means to empty the water out of said reservoir through said low pressure section of said pump.

6. In a washing machine, a wash water tub, a water pressure operated clothes water extractor, and a pump, said pump comprising a high pressure unit and a low pressure unit, said low pressure unit having a discharge conduit, communicating maximum water level overflow and extractor expressed water drain means connected for discharge through said low pressure unit, and said high pressure unit being interposed in conduit means connected to supply wash water under pressure to operate said extractor.

7. In a washing machine, a wash water tub, a water pressure operated clothes water extractor, and a pump, said pump comprising a high pressure unit and a low pressure unit, said low pressure unit having a discharge conduit, communicating maximum water level overflow and extractor expressed water drain means connected for discharge through said low pressure unit, and said high pressure unit being interposed in conduit means connected to supply wash water under pressure to operate said extractor, and adjustable pressure relief means connected with said high pressure unit to provide a predetermined high pressure limit in the high pressure pump unit and in the connected conduit system of the latter.

8. In a washing machine, a wash water tub, a water pressure operated clothes water extractor, and a pump, said pump comprising a high pressure unit and a low pressure unit, said low pressure unit having a discharge conduit, communicating maximum level wash water overflow and extractor expressed water drain means attached for discharge through said low pressure unit, said high pressure unit being interposed in conduit means connected to supply wash water under pressure to operate said extractor, and valve means interposed between said high and low pressure units in said pump to selectively cause independent operation of each unit or to provide communication between said units for draining washing machine water through said low pressure unit to discharge.

9. In a washing machine, a wash water tub, a water pressure operated clothes water extractor, and a pump, said pump comprising a high pressure unit and a low pressure unit, said low pressure unit having a discharge conduit, communicating wash water overflow and extractor expressed water drain means attached for discharge through said low pressure unit, said high pressure unit including conduit means connected with said wash water tub and with said extractor to deliver water under pressure to operate said extractor, said drain means having a water entry opening disposed at a given elevation above said pump to establish a normal maximum wash water supply level for the operation of the machine.

10. In a clothes washing machine, a wash water tub, a water pressure operated wash water extractor for the clothes, and a water handling system comprising a dual unit pressure pump, a water conduit structure connected between said tub and said extractor and having communication with one pressure unit of said pump to provide means to operate said extractor, and a second conduit structure providing an overflow means for said tub and for expressed extractor water and having communication with the other pressure unit of said pump for the dispensation of overflow water.

11. In a clothes washing machine, a wash water tub, a water pressure operated wash water extractor for the clothes, a water handling system comprising a dual unit pressure pump, a water conducting conduit leading from said tub to said extractor and having operative connection with one pressure unit of the pump to provide a means to supply water under pressure from said tub to operate the extractor, a second conduit having an opening positioned at a selected elevation to provide a maximum overflow water level in said tub, and water collecting means for said second conduit having communication with said tub and being arranged to receive expressed water from the clothes in said extractor, said second conduit leading into the other of said pressure units of said pump for the controlled dispensation of said overflow water.

12. In a clothes washing machine, a wash water tub, a water pressure operated wash water extractor for the clothes, a water handling system comprising a dual unit pressure pump, a water conducting conduit leading from said tub to said extractor and having operative connection with one pressure unit of the pump to provide a means to supply water under pressure from said tub to operate the extractor, a second conduit having an opening positioned at a selected elevation to provide a maximum overflow water level in said tub, water collecting means for said second conduit having communication with said tub and being arranged to receive expressed water from the clothes in said extractor, said second conduit leading into the other of said pressure units of said pump for the controlled dispensation of said overflow water, said pump having a single drive element to operate both units thereof, power operated means to drive said element, said power operated means and said pump both being reversible in operation to provide said extractor with water under pressure to render said extractor operative when the drive is in one direction, and to withdraw water under suction from said extractor to quickly relax and to expand the clothes in the extractor when the drive is in the other direction.

13. In a clothes washing machine, a wash water tub, a water pressure operated wash water extractor for the clothes, a water handling system comprising a dual unit pressure pump, a water conduit structure connected between said tub and said extractor and having communication with one pressure unit of said pump to provide means to operate said extractor, a second conduit structure providing an overflow means for said tub and for the expressed extractor water and having communication with the other pressure unit of said pump for the dispensation of overflow water, and valve means arranged to selectively bypass water from the one pressure unit of the pump into the other overflow connected pressure unit of the pump to selectively draw wash water out of said tub together with possible residual water out of said extractor for appropriate discharge.

14. In a washing machine, a wash water suply, a water pressure operated clothes water extractor, and a pump, said pump comprising a high pressure unit and a low pressure unit, said low pressure unit having a water discharge conduit, communicating maximum level wash water overflow and extractor expressed water drain means connected for discharge through said low pressure unit, said high pressure unit having supply conduit means connected with said wash water supply to receive said wash water and connected with said extractor to provide said extractor with said wash water under pressure, said overflow having an upwardly open water entry port, and a valve means to keep said high and low pressure units of the pump under independent operation and to provide means to connect said units to discharge the wash water from the machine through one of the pressure units, said valve means including an auxiliary valve member to normally close off said overflow during water discharge, said auxiliary valve member being flexible to react under weight to bypass water into the pump whenever additional water finds its way into said overflow during the operation of the washing machine.

15. In a clothes washing machine, a wash water tub, a water pressure operated clothes water extractor having drain means for the expressed water, a water collecting unit to receive water from said drain means and having communication with said tub, said collecting unit having an overflow duct to receive water from said extractor or tub with said duct terminating at a given upward elevation to determine the maximum water level to be permitted in said tub, said tub and said extractor having a water conduit connected therebetween for the supply of water for the operation of said extractor, a pump to serve said overflow duct and said pump comprising a low pressure unit having its intake connected with said overflow duct and its outlet open to discharge, and a high pressure unit connected in series with said water conduit to provide means to deliver water from said tub to said extractor and to withdraw water from said extractor to return it to the tub.

16. A pump for a fluid system necessitating a high pressure fluid source and a low pressure fluid drainage means, said pump comprising a high pressure unit and a low pressure unit, a discharge conduit for said low pressure unit, a maximum fluid level overflow for said fluid system, auxiliary fluid drain means to divert excess fluid from said system, said overflow and said fluid drain means being connected for discharge through said low pressure unit, said high pressure unit being interposed in conduit means in said system to supply fluid under pressure, and a valve controlled port structure in said pump to separate said high and low pressure units of said pump, said valve comprising a valving head to open or close said port to control fluid communication between said units, and a stem connected with said valve and extending from said pump into a position above the high fluid level limit of said system, said stem having an operating knob disposed for constant access by an operator, and releasable detent means to hold said valve in open position including spring means to normally hold said valve head closed upon said port when said valve is released from said detent means.

17. A pump for a fluid system necessitating a high pressure fluid source and a low pressure fluid drainage means, said pump comprising a high pressure unit and a low pressure unit, a discharge conduit for said low pressure unit, a maximum fluid level overflow for said fluid system, auxiliary fluid drain means to divert excess fluid from said system, said overflow and said fluid drain means being connected for discharge through said low pressure unit, said high pressure unit being interposed in conduit means in said system to supply fluid under pressure, and a valve controlled port structure in said pump to separate said high and low pressure units of said pump, said valve comprising a valving head to open or close said port to control fluid communication between said units, and a stem connected with said valve and extending from said pump into a position above the high fluid level limit of said system, said stem having an operating knob disposed for constant access by an operator, and releasable detent means to hold said valve in open position including spring means to normally hold valve head closed upon said port when said valve is released from said detent means, and a secondary pump orifice interposed between said low pressure unit of said pump and the connected overflow and excess fluid drain means, said valve including a second valve member to coact with said secondary pump orifice to close the latter upon the opening of said valve controlled port structure, and a deflectable diaphragm on said valve arranged to coact with said pump orifice to close off the latter when said valve head closes said pump port to counteract gurgling fluid noises, said diaphragm being automatically deflected to pass drain fluid through said orifice when overflow occurs.

References Cited in the file of this patent

UNITED STATES PATENTS

| | | |
|---|---|---|
| 1,926,378 | Gerz | Sept. 12, 1933 |
| 2,049,057 | Geldhof et al. | July 28, 1936 |
| 2,421,252 | Dunham | May 27, 1947 |
| 2,562,533 | Dunlap | July 31, 1951 |
| 2,643,613 | Westbury et al. | June 30, 1953 |
| 2,666,315 | Abresch | Jan. 19, 1954 |
| 2,688,925 | Thoren et al. | Sept. 14, 1954 |
| 2,728,352 | Sanders | Dec. 25, 1955 |
| 2,759,348 | Gibson | Aug. 21, 1956 |
| 2,817,228 | Koplin | Dec. 24, 1957 |